United States Patent
Kozlov

(10) Patent No.: US 7,085,441 B1
(45) Date of Patent: Aug. 1, 2006

(54) FIBER-OPTIC GYROSCOPE WITH DEPOLARIZER USING INTEGRATED OPTIC WAVEGUIDE

(75) Inventor: Valery A. Kozlov, Foxboro, MA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/072,737

(22) Filed: Mar. 4, 2005

(51) Int. Cl.
*G02B 6/00* (2006.01)

(52) U.S. Cl. .......................... 385/11; 385/27
(58) Field of Classification Search ............. None
See application file for complete search history.

(56) References Cited

U.S. PATENT DOCUMENTS

| | | | | |
|---|---|---|---|---|
| 5,598,489 A | * | 1/1997 | Pavlath et al. | 385/12 |
| 5,854,678 A | * | 12/1998 | Liu et al. | 356/462 |
| 5,949,930 A | * | 9/1999 | Cordova et al. | 385/27 |
| 6,522,796 B1 | * | 2/2003 | Ziari et al. | 385/11 |
| 6,870,972 B1 | * | 3/2005 | Miyata et al. | 385/11 |
| 2003/0202768 A1 | * | 10/2003 | Nasiri et al. | 385/137 |

* cited by examiner

*Primary Examiner*—Sung Pak
(74) *Attorney, Agent, or Firm*—Carmen B. Patti & Assoc., LLC

(57) ABSTRACT

A fiber-optic gyroscope apparatus includes a light source, an optical coupler, a photodetector and an optical circuit device having at least one input, at least two outputs and a birefringent crystal substrate waveguide as a first segment of a Lyot type depolarizer between the input and the outputs. An input fiber of polarization maintaining fiber composition operating as a second segment of a Lyot type depolarizer is located between the optical coupler and the optical circuit device. A sensing coil is coupled to the outputs of the optical circuit device. The input fiber is fixed at approximately 45 degrees to the waveguide, with the input fiber and waveguide cooperating to form a Lyot type depolarizer. Other implementations of the fiber-optic gyroscope apparatus are also disclosed.

19 Claims, 6 Drawing Sheets

FIBER-OPTIC GYROSCOPE WITH DEPOLARIZER USING INTEGRATED OPTIC WAVEGUIDE

TECHNICAL FIELD

The invention relates generally to instruments such as interferometric fiber-optic gyroscopes (IFOG) which utilize an integrated optic circuit having a birefringent crystal substrate waveguide and in particular to such instruments in which it is desirable to reduce the degree of polarization of optic signals.

BACKGROUND

In the field of inertial sensors, increasing cost and performance demands are being placed on proven existing systems, such as electromechanical instruments and, more recently, ring laser gyroscopes. Currently, efforts are being placed on improving newer technologies, such as interferometric fiber-optic gyroscopes (IFOG). The emphasis today is not so much on improving sensor performance, as meeting other practical demands such as reducing system size while lowering material and assembly costs. While ring laser gyroscopes are finding continued commercial success in specialized applications, interferometric fiber-optic gyroscopes have not achieved the potential that was hoped for at their inception. Unit costs and construction difficulties have been cited as areas for improvement.

Thus, a need exists for improving construction materials and techniques used to produce interferometric fiber-optic gyroscopes. For example, cost savings are possible with single mode components, although depolarizers and other additional components may be required to prevent signal deterioration. Further, there is a need for improved construction of interferometric fiber-optic gyroscopes using cost effective techniques such as those associated with integrated circuit technology. U.S. Pat. No. 5,377,283 is directed to the configuration control of mode coupling errors, and points out added complications, such as second order dispersion effects, which result when an integrated optic chip, such as one having a substrate formed of lithium niobate, is employed in a fiber optic circuit. This patent also employs a circuit in which both single mode and polarization maintaining optical fibers are employed, along with depolarization remediation attained by splicing first and second polarization maintaining optical fibers. Depolarized fiber optic gyroscopes are also disclosed in U.S. Pat. No. 4,828,389 of Gubbins et al. covering "Integrated Triad Optical Rate Sensor Apparatus," and U.S. Pat. No. 5,260,768 of Cordova, et al. covering "Fiber optic gyro with low-birefringence and PM networks". Despite these advances, further improvements are needed.

SUMMARY

The invention in one implementation encompasses an apparatus, and more particularly comprises a fiber-optic gyroscope apparatus including a light source, an optical coupler, a photodetector and an optical circuit device having at least one input, at least two outputs and a birefringent crystal substrate waveguide between the input and the outputs. An input fiber of polarization maintaining fiber composition is located between the optical coupler and the optical circuit device. A sensing coil is coupled to the outputs of the optical circuit device. The input fiber birefringence axes are fixed at 45 degrees to the birefringence axes of the waveguide, with the input fiber and waveguide cooperating to form a Lyot-type depolarizer.

In another implementation, the invention encompasses a fiber-optic gyroscope apparatus including a Lyot-type depolarizer comprised of a combination of fiber and non-fiber components. The apparatus includes a light source, at least one optical coupler having an input coupled to the light source and an output, and at least one photodetector coupled to the optical coupler. An optical circuit device includes an optical circuit built on a waveguide of birefringent crystal substrate material, and a housing surrounding the optical circuit. The optical circuit device has at least one input, and at least two outputs with the waveguide between the input and the outputs. An input fiber of polarization maintaining fiber composition couples the output of the at least one optical coupler to the input of the optical circuit device, with the housing providing access for the input fiber to the waveguide. A fixed orientation coupling maintains a fixed angular orientation between the input fiber and the waveguide, with the input fiber and the waveguide cooperating to comprise a Lyot-type depolarizer, reducing the degree of polarization of optical signals traveling between the input fiber and the waveguide.

In yet another implementation, the invention encompasses a method for providing gyroscope sensing comprising the step of providing a light source, and at least one optical coupler having an input and an output. The method further includes the steps of coupling the light source to the input of the optical coupler, providing at least one photodetector and coupling the at least one photodetector to the optical coupler input. An optical circuit device is provided with at least one input, at least two outputs and a birefringent crystal substrate waveguide between the input and the outputs. The method continues with the steps of providing an input fiber of polarization maintaining fiber composition, coupling the output of the at least one optical coupler to the input of the optical circuit device with the input fiber, providing at least one sensing coil of optical fiber with a pair of optic fiber pigtails and coupling the optic fiber pigtails to the outputs of the optical circuit device. One end of the input fiber is supported with a fixed orientation of approximately 45 degrees to the waveguide of the optical circuit device. The input fiber and waveguide cooperate to comprise a Lyot-type depolarizer, reducing the degree of polarization of optical signals traveling between the input fiber and the waveguide.

DESCRIPTION OF THE DRAWINGS

Features of exemplary implementations of the invention will become apparent from the description, the claims, and the accompanying drawings in which:

DETAILED DESCRIPTION

Figure 1:
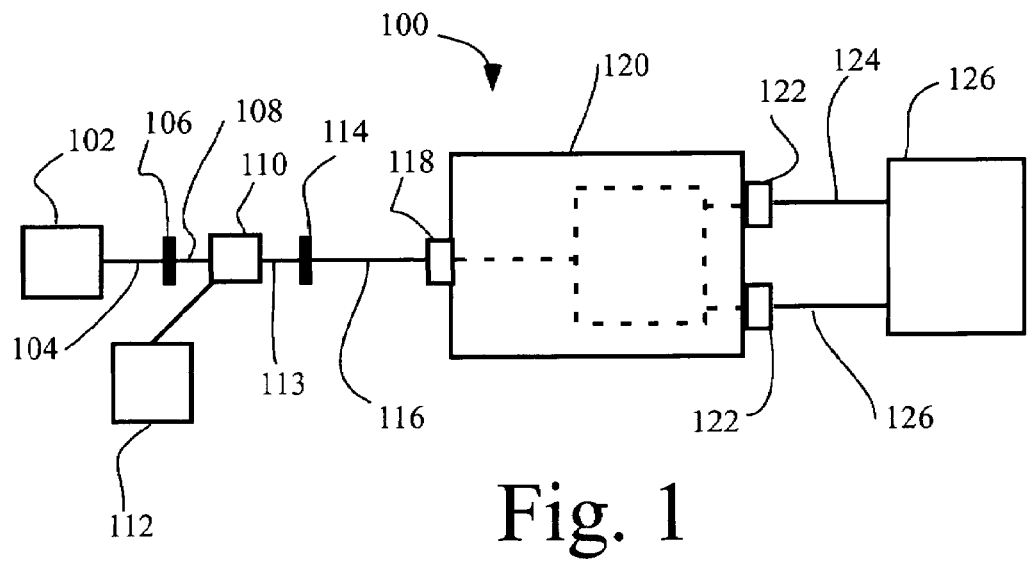
FIG. 1 is a representation of a prior art fiber-optic gyroscope employing polarization-maintaining (PM) fibers throughout.

Turning to FIG. 1, an apparatus 100 is one example of an all-fiber fiber-optic gyroscope constructed according to known techniques which comprises a plurality of known, commonly available hardware components of the more costly, polarization maintaining (PM) type. A broadband light source 102 with a low degree of coherence has a pigtail 104 of the polarization maintaining fiber type which is spliced at 106 with the polarization maintaining input lead 108 of a 2×2 fiber coupler 110. Fiber coupler 110 is coupled to a conventional photodetector 112, as is known in the art, to measure the interferometer signal. If desired, fiber coupler 110 can comprise any N×M coupler.

A polarization maintaining output lead 113 is spliced at 114 to a polarization maintaining fiber 116, providing connection through an input fiber block assembly (FBA) 118 to an integrated-optic circuit 120. The output of integrated optic circuit 120 is coupled through fiber block assemblies 122 to polarization maintaining pigtail fibers 124 of coil 126

Figure 2:
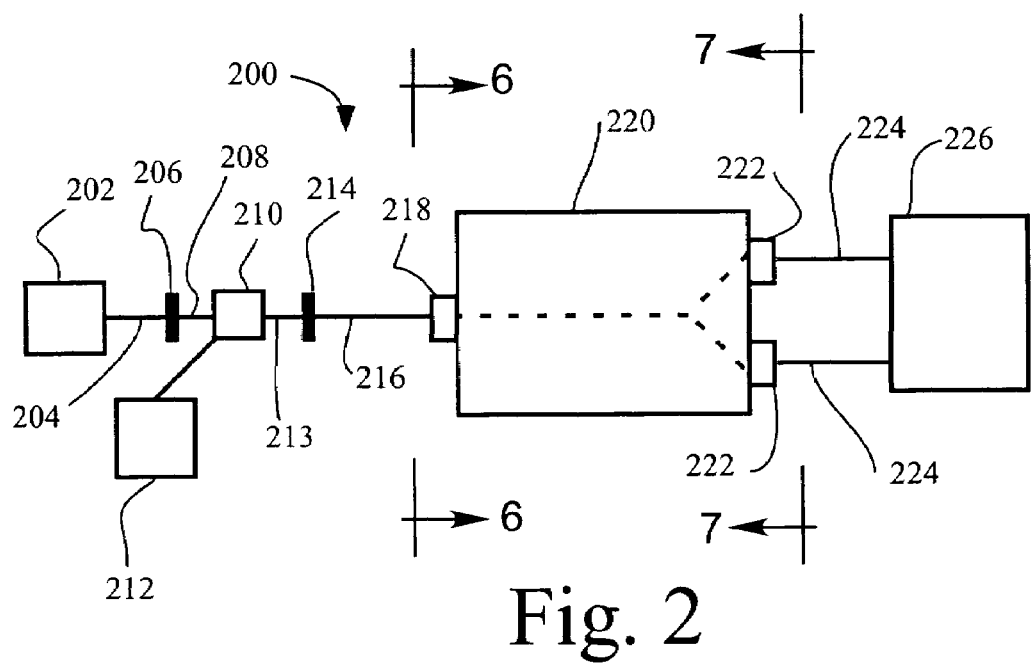
FIG. 2 is a representation of one exemplary interferometric fiber-optic gyroscope with an optical circuit device having a waveguide which functions as a second segment of a Lyot type depolarizer.

The integrated-optic circuit 120 may comprise any of a number of known types. Since all fiber components in interferometric fiber-optic gyroscope 100 are made of PM fiber compositions, and since the light source 102 has a low degree of polarization, there is no need to add the cost of depolarizers. However, construction of the interferometric fiber-optic gyroscope 100 incurs substantial added costs associated with polarity maintaining components. Cost advantages can be attained if some, or all of the components are of the single mode type, i.e. are made of single mode fibers. However, depolarizers should be used to prevent interferometer signal polarization fading effects. As will be seen herein, FIG. 2 shows one example of an interferometric fiber-optic gyroscope illustrating principles of the present invention, which provides cost and performance improvements over interferometric fiber-optic gyroscopes having conventional all-fiber depolarizers of the type shown in FIG. 3.

Figure 3:
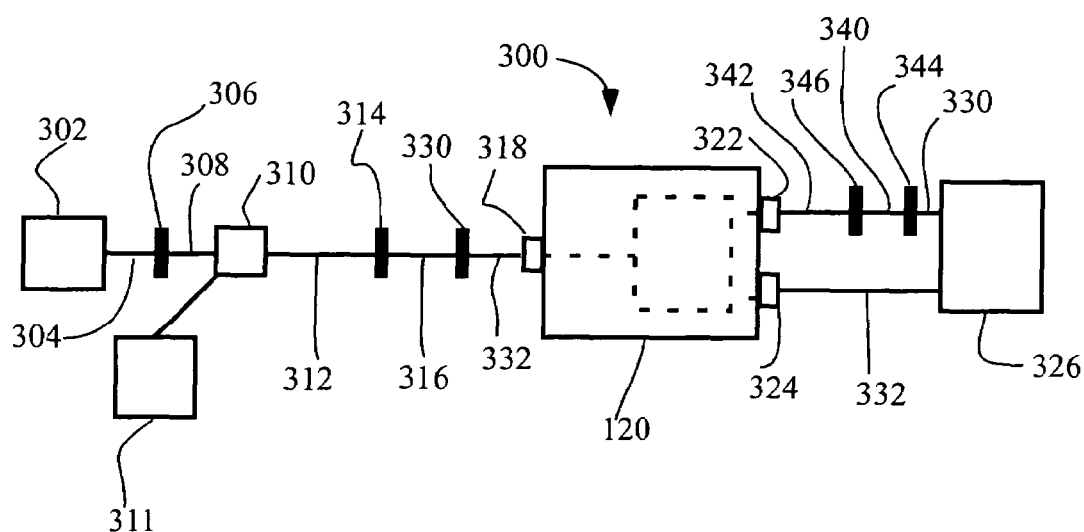
FIGS. 3 and 4 are representations of a prior art fiber-optic gyroscope employing all-fiber Lyot type depolarizers.

Referring now to FIG. 3, an apparatus 300 shows one example of an interferometric fiber-optic gyroscope, similar to that shown in FIG. 1, but which includes single mode components, and which employs depolarizers of the all-fiber type to prevent interferometer signal polarization fading effects. A broadband light source 302 has a pigtail 304 of the single mode fiber type which is spliced at 306 with the single mode input lead 308 of a 2×2 fiber coupler 310. Fiber coupler 310 is coupled to a conventional photodetector 311, as is known in the art. A single mode fiber or output lead 312 is spliced at 314 to a first segment polarization maintaining fiber 316, which in turn, is connected through splice 330 to a second segment polarization maintaining fiber 332. First and second segments 316, 322 together comprise a conventional all-fiber Lyot polarizer. Fiber 332 is connected through an input fiber block assembly (FBA) 318 to the integrated-optic circuit 120.

The output of integrated optic circuit 120 is coupled through fiber block assemblies 322 and 324 to coil 326. For further cost reduction, coil 326 is of the single mode type, with single mode fibers 330, 332. However, in order to provide protection against signal fading, one lead of coil 326 is coupled to fiber block assembly 322 through a conventional all-fiber Lyot polarizer comprising the serial connection of polarization maintaining fibers 340, 342 and splices 344, 346. In the arrangement of FIG. 3, two all-fiber depolarizers are used, one at the input to integrated-optic circuit 120, and the other at the upper output (i.e. the fiber block assembly 322) of integrated-optic circuit 120. The first all-fiber depolarizer is formed by the serial connection of polarization maintaining fibers 316, 332. The second all-fiber depolarizer is formed by the serial connection of polarization maintaining fibers 340, 342. Thus, in addition to penalties incurred in increased material and assembly costs, signals in the interferometric fiber-optic gyroscope 300 must pass through five splices, with attendant signal degradation.

Figure 4:
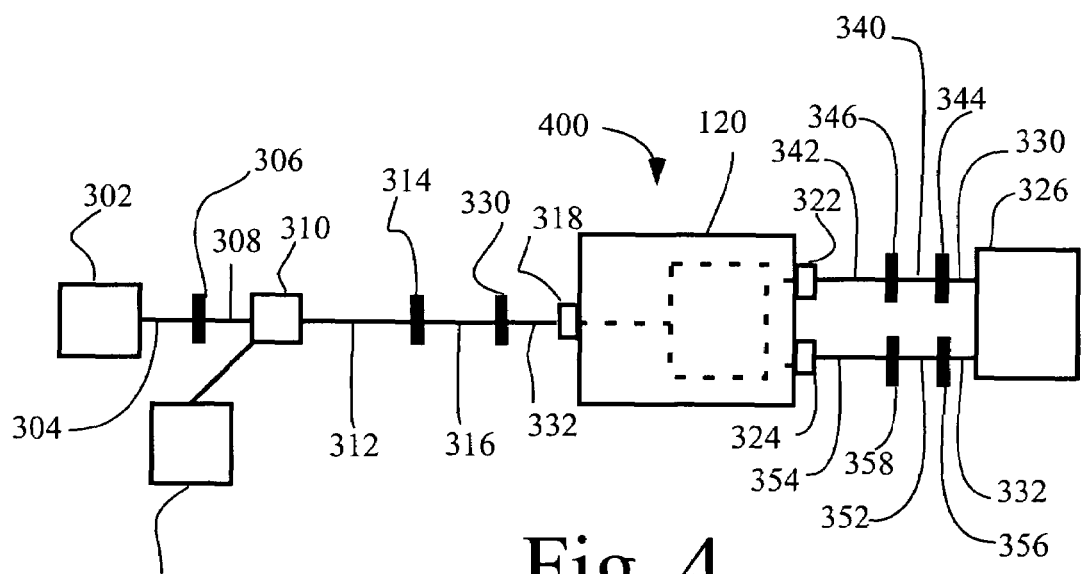

FIG. 4 shows an interferometric fiber-optic gyroscope 400 substantially similar to interferometric fiber-optic gyroscope 300, except that the second, lower coupling between the coil 326 and fiber block assembly 324 is also provided with an all-fiber depolarizer arrangement, comprised of polarization maintaining fibers 352, 354 and splices 356, 358. This third depolarizer addresses deleterious effects of asymmetry associated with coil 326. Temperature gradients influence interferometric fiber-optic gyroscope bias stability through the Shupe effect. Polarizing maintaining and single mode fibers have different waveguide properties. If the interferometric fiber-optic gyroscope has only one depolarizer between integrated-optic circuit 120 and the single mode coil 326, the Shupe effect may be larger due to asymmetry in propagation conditions for clockwise and counterclockwise beams in the coil. This asymmetry may be removed by using the third all-fiber depolarizer between the integrated-optic circuit and the single mode coil 326.

Referring now to FIG. 2, an apparatus 200 shows one example of an interferometric fiber-optic gyroscope illustrating aspects of a present invention, and which comprises a plurality of known, commonly available single mode hardware components, thus contributing to the cost effectiveness and flexibility of assembly provided by aspects of the present invention. In the arrangement shown in FIG. 2, while all of the components can be selected from the less costly, single mode (SM) types available, the fiber optic coil 226 is chosen to be of the polarization maintaining type. Substantial cost advantages in materials and construction are made possible by employing a single mode broadband light source 202 and a single mode coupler 210. The broadband light source 202 can emit either polarized or unpolarized light. The broadband light source 202 has a single mode fiber or pigtail 204 which is spliced at 206 with the single mode fiber input lead 208 of a 2×2 fiber coupler 210. Fiber coupler 210 is coupled to a conventional photodetector 212 to measure the interferometer signal.

A single mode output lead 213 is spliced at 214 to a polarization maintaining fiber 216, providing connection through an input fiber block assembly (FBA) 218 to an optical circuit device or integrated-optic circuit 220. The output of integrated optic circuit 220 is coupled through fiber block assemblies 222 to polarization maintaining fibers 224 of coil 226. The integrated-optic circuit 220 may comprise any of a number of commercially available optical circuit devices having a birefringent crystal substrate or waveguide, but preferably comprises a type commonly referred to as a multipurpose integrated optical circuit (MIOC).

The preferred integrated-optic circuit 220 is built on a crystal substrate or waveguide of lithium niobate (LiNbO3) material or any other non-isotropic material suitable for integrated-optic waveguides, and has a housing with three ports providing external connection to an internal waveguide coupler/beam splitter, such as a Y-type waveguide coupler and phase modulator disposed within the housing in a defined, preferably horizontal, orientation. The preferred integrated-optic circuit is constructed according to the teachings of U.S. Pat. Nos. 5,442,719 and 6,128,424 the disclosures of which are incorporated by reference as if fully set forth herein.

According to certain aspects of the present invention, a mixed mode Lyot-type depolarizer is constructed using a minimum number of conventional components. The term "mixed mode" is used herein to denote a depolarizer utilizing the Lyot effect produced by the combination of fiber and non-fiber components, such as the waveguide of an appropriate integrated-optic circuit, having crystal substrate material that exhibits substantial birefringence properties and that can be accessed from the outside of the integrated-optic circuit by fixed orientation couplings (such as those of the fiber block assembly type) that maintain a fixed angular orientation between external optic fibers and the internal waveguide. As mentioned above, the preferred integrated-optic circuit has three ports providing connection to a Y-type waveguide coupler and phase modulator. Practical depolarization or polarization averaging is preferably achieved herein by means of a Lyot-type depolarizer in conjunction with a broadband light source, an arrangement discussed by W. K. Burns, "Degree of Polarization in the Lyot Depolarizer," J. Lightwave Tech., Vol 1, p. 475 (1983) the disclosure of which is hereby incorporated by reference.

According to certain aspects of the present invention, the waveguide or crystal substrate of the integrated-optic circuit 220 is employed as one segment of a Lyot type depolarizer, with a piece of birefringence fiber (polarization maintaining fiber 216) between the single mode coupler 210 and the integrated-optic circuit 220 as another depolarizer segment. The fiber birefringence axis is oriented with a 45 degree angle relative to the waveguide birefringence axis of the integrated-optic circuit. The lithium niobate (LiNbO3) waveguide of the preferred integrated-optic circuit 220 has a birefringence of approximately 0.05–0.07 for visible and infrared spectral ranges. Polarization maintaining fiber 216 has a typical birefringence $\delta n$ of approximately 0.0004. The depolarization length is calculated as $L=\lambda^2/(\Delta\lambda*\delta n)$, where $\lambda$ is a light source spectrum central wavelength and $\Delta\lambda$ is a spectrum linewidth. The physical length of polarization maintaining fiber 216 is preferably on the order of one meter or longer, enough to have a depolarization length longer than the depolarization length L for typical broadband light sources (Super Luminescent Diode (SLD) or Amplified Spontaneous Emission (ASE) sources). The waveguide birefringence is so high that the Lyot condition L2>2L1 will be easily satisfied with the waveguide of the preferred integrated-optic circuit, which typically has a physical length of 20–35 mm, thus being capable of successful operation as a Lyot-type depolarizer second segment.

As described in this example, Lyot-type depolarization is achieved with one or more optic fibers connected to the input and/or one or more outputs of an optical circuit device having a birefringent crystal substrate waveguide disposed between its input and outputs. It is generally preferred, in order to satisfy Lyot-type polarizer conditions, that the waveguide have the longer of the two Lyot-type depolarizer lengths and that the optic fiber have the shorter. While it is possible, and is contemplated by the present invention, that the relative lengths could be reversed, this would require that the fiber length, in order to have longer depolarization length than that of the waveguide, would have to have a very long physical length, on the order of 100 meters for the example given here, and thus is not preferred.

Figure 6:
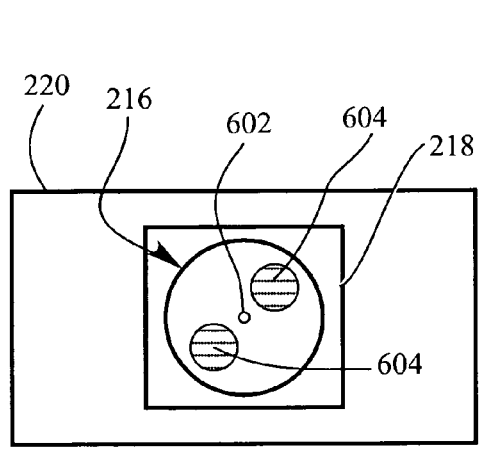
FIG. 6 is a fragmentary cross-sectional view taken along the line 6—6 of FIG. 2.

In the arrangement of FIG. 2, the Lyot-type depolarizer according to aspects of the present invention is comprised of two sections of birefringence material(s) with their birefringence axes oriented with a 45 degree angle, a section depolarization length ratio (L1/L2) which is not less than 2, and the depolarizer first section length LI longer than depolarization length of the light source employed. To prevent polarization fading effects in interferometric fiber-optic gyroscope 200 (due to the use of single mode fiber components at the input stage of the integrated-optic circuit 220), the depolarizer is preferably located at the input of the integrated-optic circuit. A 45 degree relative angular displacement between the Lyot-type depolarizer first segment, polarization maintaining fiber 216, and the waveguide internal to integrated-optic circuit 220, is illustrated in FIGS. 6 and 7, where the waveguide or crystal substrate is mounted in the housing of integrated-optic circuit 220 so as to be oriented parallel to the horizontal.

Preferably, the input connection to the integrated-optic circuit 220, fiber block assembly 218, is chosen to provide the fixed angular orientation required, with the fiber block assembly 218 oriented with a zero degree displacement of its birefringence axis relative to the waveguide, and with the polarization maintaining fiber 216 fixed at a 45 degree displacement relative to the fiber block assembly. If desired, the polarization maintaining fiber 216 can be oriented at a zero degree displacement relative to the fiber block assembly, with the fiber block assembly being fixed at a 45 degree displacement relative to the integrated-optic circuit 220. As a further alternative, the waveguide can be rotated within its housing to achieve the 45 degree displacement. The invention contemplates arrangements wherein the displacement is not exactly 45 degrees, but is only approximately 45 degrees, consistent with the level of depolarization needed for the particular application. For example, many applications requiring fairly high levels of depolarization are satisfied with angular displacements ranging between 44.5 degrees and 45.5 degrees. The invention contemplates substantially broader ranges of displacements than this.

Figure 7:
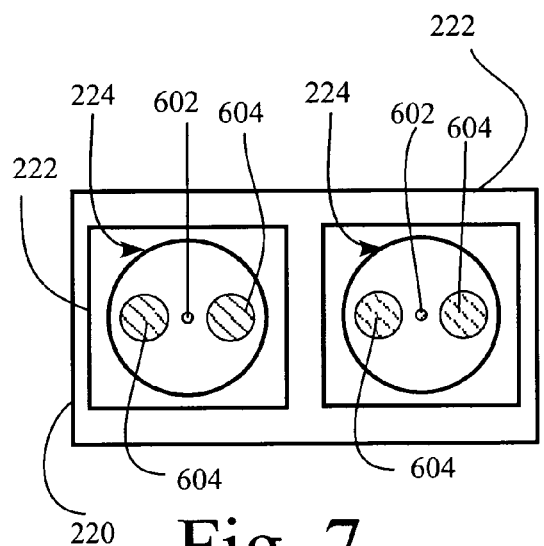
FIG. 7 is a fragmentary cross-sectional view taken along the line 7—7 of FIG. 2.

FIG. 7 shows the preferred relative orientation of zero degrees between the polarization maintaining fibers 224 and the waveguide within integrated-optic circuit 220, aligned within integrated optic circuit 220 in a horizontal direction. The arrangement of FIG. 7 provides a ready visual comparison to the 45 degree relative orientation between the input polarization maintaining fiber 216 and the input connection of fiber block assembly 218 shown in FIG. 6. In FIGS. 6 and 7, polarization maintaining fibers of the "PANDA" type are denoted by the reference numerals 216, 224 and include a core 602 and stress rods 604. The present invention also contemplates the use of virtually any polarization maintaining fibers known today. As can be seen by comparing FIGS. 6 and 7, the input polarization maintaining fiber of FIG. 6 is rotated 45 degrees with respect to the output polarization maintaining fibers of FIG. 7, and thus is rotated with respect to the horizontally oriented crystal substrate waveguide supported within the housing of integrated-optic circuit 220, thereby fulfilling the angular offset requirement for Lyot-type depolarizer operation.

Figure 5:
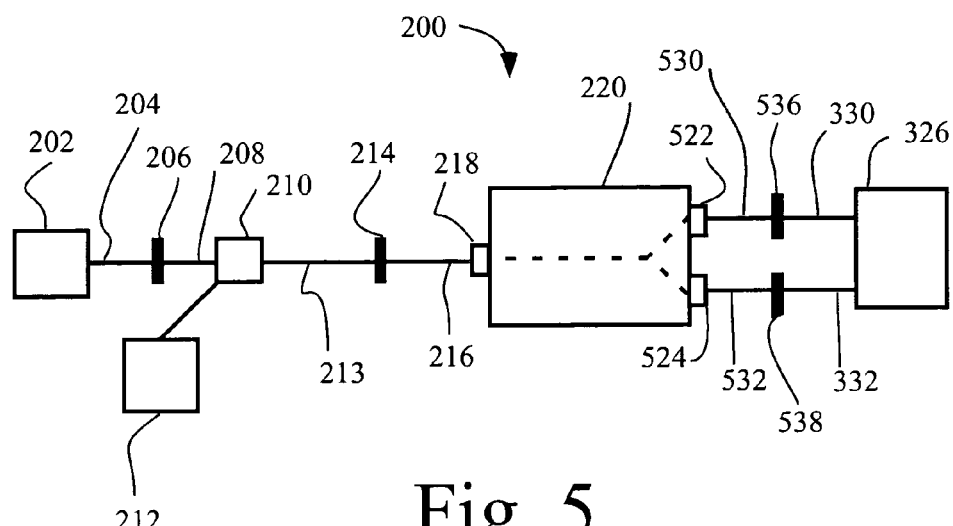
FIG. 5 is a representation of one exemplary interferometric fiber-optic gyroscope with an optical circuit device having a waveguide which functions as a second segment of a Lyot type depolarizer and which has single mode components throughout.

As pointed out above, in the arrangement shown in FIG. 2, the fiber optic coil 226 of apparatus 200 is chosen to be of the polarization maintaining type. Further cost reductions are now attained with an apparatus 500, shown in FIG. 5, illustrating another example of an interferometric fiber-optic gyroscope, containing many of the same components as apparatus 200. The input side of apparatus 500, that part at the input side of integrated-optic circuit 220, is identical to the corresponding portion of apparatus 200 and thus includes a first mixed mode Lyot type depolarizer, formed at the input to integrated-optic circuit 220. As will now be seen, apparatus 500 further includes two additional mixed-mode Lyot-type depolarizers located at the outputs of integrated-optic circuit 220, which allow use of a fiber optic coil of the cost effective single mode type, while keeping constant the interferometer signal intensity after the integrated-optic circuit 220.

With continued reference to FIG. 5, the outputs, or fiber block assemblies 522, 524 of the integrated-optic circuit 220, are coupled to the single mode leads 330, 332 of coil 326 through respective polarization maintaining fibers 530, 532 and splices 536, 538. The polarization maintaining fibers 530, 532 each have the 45 degree orientation illustrated in FIG. 6, that is, they are oriented at a relative 45 degree angle with respect to the crystal substrate disposed within the housing of integrated-optic circuit 220. This fixes a 45° displacement between the birefringence axes of the pigtail fibers and of the birefringence axis of the waveguide. For further cost reduction, all three mixed-mode depolarizers in the arrangement of FIG. 5 can be manufactured simultaneously during the pigtailing termination process associated with the integrated-optic circuit.

As can be seen by comparing the arrangements of FIGS. 4 and 5, the same level of depolarizer enhancement is provided by aspects of the present invention, while allowing a substantial reduction in the number of fiber splices required, and with attendant reduction in material and labor costs. In addition, interferometric fiber-optic gyroscopes constructed according to principles of the present invention also enjoy a substantial reduction in overall apparatus volume, compared to corresponding apparatus employing all-fiber depolarizers.

Figure 8:
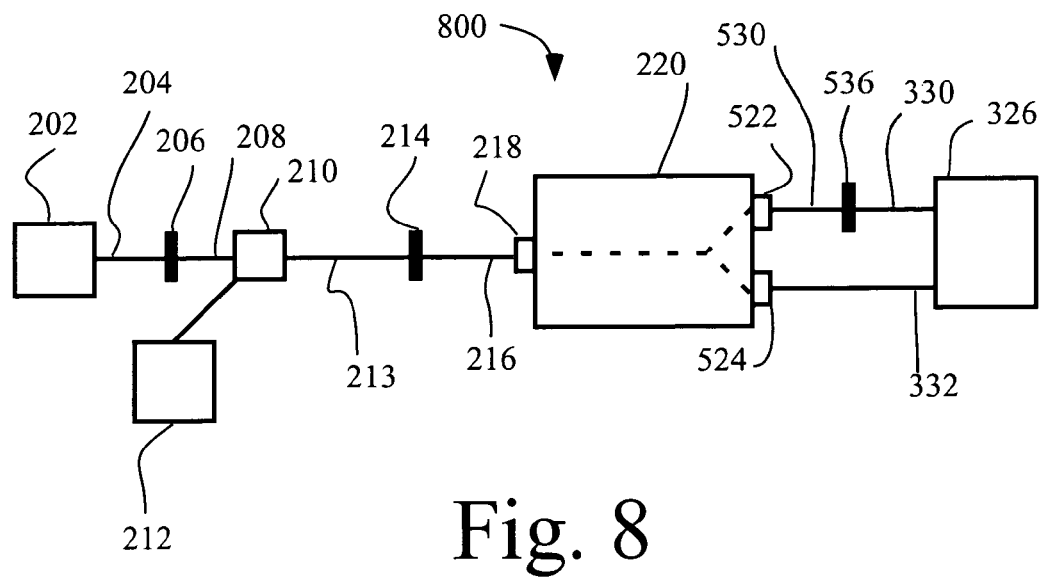
FIG. 8 is a second representation of an exemplary interferometric fiber-optic gyroscope.

Referring now to FIG. 8, an apparatus 800 is similar in many respects to the apparatus 500 discussed above. However, the apparatus 800 comprises but a single depolarizer in the output loop formed between coil 326 and the output ports 522, 524. As can be seen in FIG. 8, no depolarizer is provided for the pigtail 332 of coil 326. The pigtail 330, rather than being connected to output port 522, is coupled to output port 522 of integrated-optic circuit 220 through a splice 536 and a section of polarizing maintaining fiber 530 of appropriate length, as is readily determinable by one skilled in the art, to satisfy Lyot-type depolarizer conditions. The birefringence axis of a fiber 530 is maintained at a 45° displacement to the birefringence axis of the waveguide of integrated-optic circuit 220, to further satisfy Lyot-type depolarizer conditions.

Figure 9:
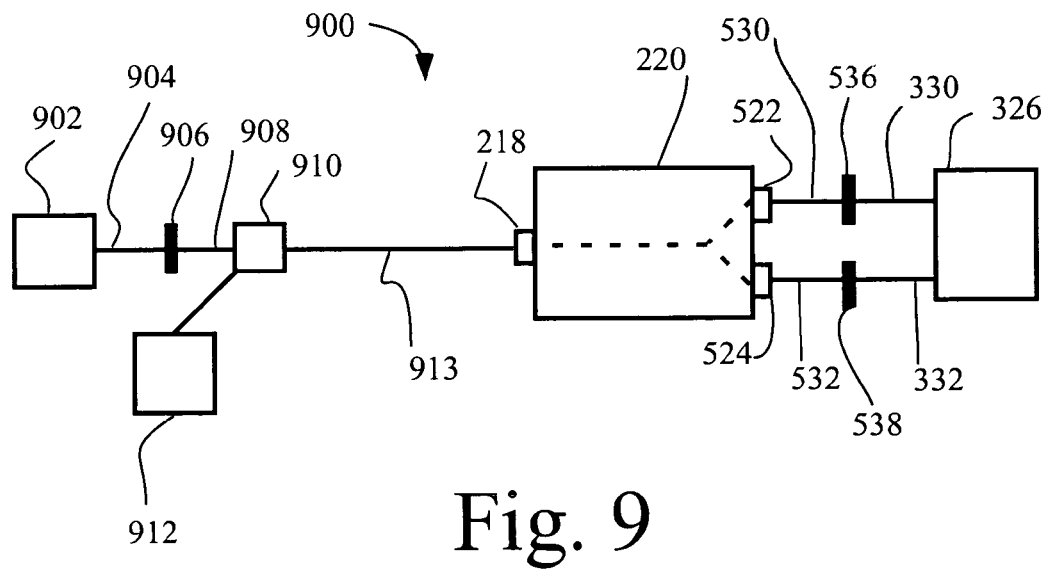
FIG. 9 is a third representation of an exemplary interferometric fiber-optic gyroscope.

Referring now to FIG. 9, apparatus 900 has an integrated-optic circuit 220 and an output portion similar to that of apparatus 500 discussed above. Apparatus 900, however, does not require a depolarizer for its input section because either the broadband light source 902 has a low degree of polarization or there are polarization maintaining fiber components before the integrated-optic circuit, and the since the components providing coupling to the input 218 are of the polarization maintaining type. For example, the fiber-optic leads 904, 908, connecting light source 902 to coupler 910 are of the PM fiber type, as is the optic fiber 913 between coupler 910 and input 218. If desired, splice 906 and fiber 908 could be eliminated with a single fiber connecting light source 902 to coupler 910. Coupler 910 allows optical communication with detector 912.

Figure 10:
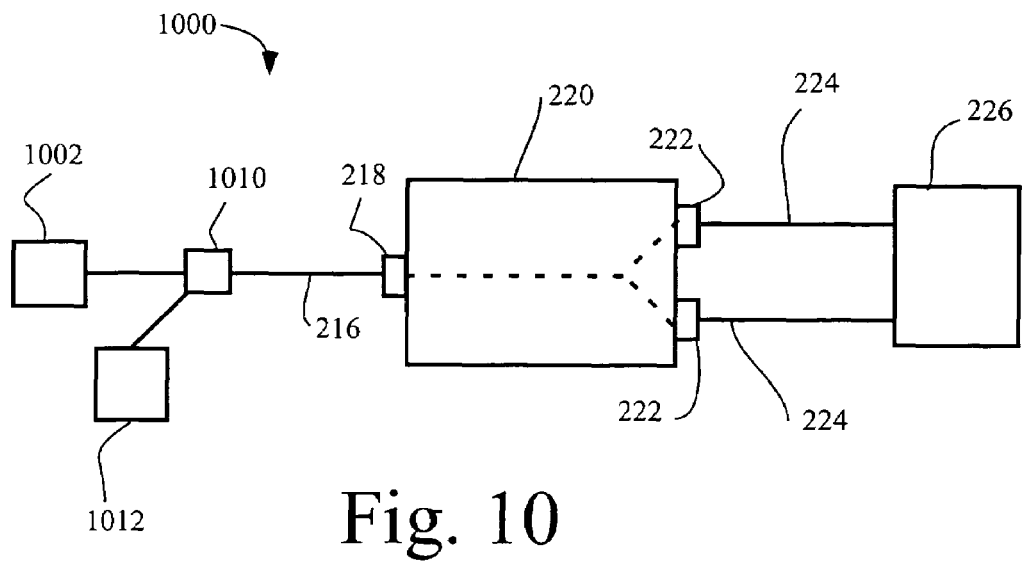
FIG. 10 is a fourth representation of an exemplary interferometric fiber-optic gyroscope.

Referring now to FIG. 10, apparatus 1000 has an integrated-optic circuit 220 and an output portion including coil 226 similar to that of FIG. 2 described above. However, apparatus 1000 has an input section different from apparatus 200. In the arrangement of apparatus 1000, a single continuous PM fiber 216 connects broadband light source 1002 to input 218 of integrated-optic circuit 220. Coupler 1010 is formed about fiber 216 in a known manner, so as to avoid the need for splices. Coupler 1010 provides optical communication with detector 1012.

Figure 11:
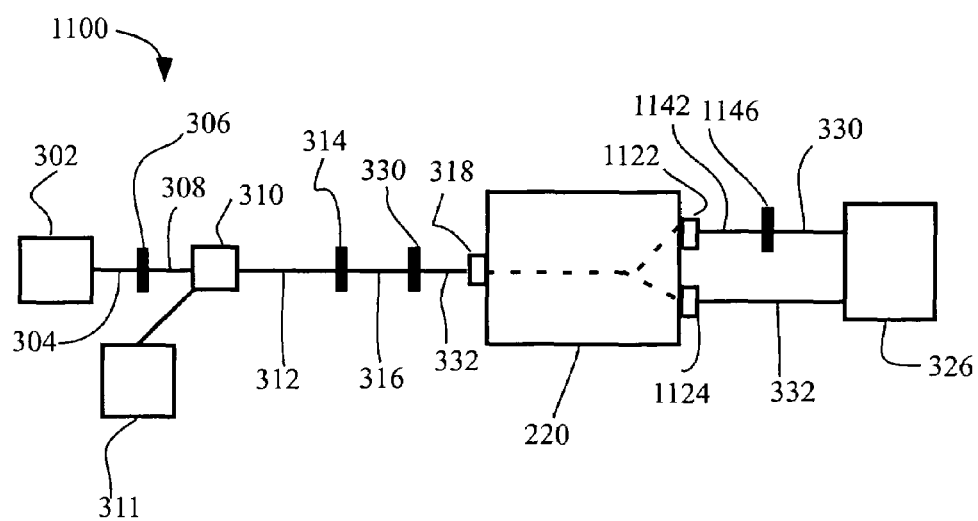
FIG. 11 is a fifth representation of an exemplary interferometric fiber-optic gyroscope.

Referring now to FIG. 11, an apparatus 1100 includes an input section similar to that of apparatus 300 described above. In apparatus 1100, integrated-optic circuit 220 has its output ports 1122, 1124 coupled to coil 326. As can be seen in FIG. 11, the pigtail lead 332 is connected directly to output port 1124 of integrated-optic circuit 220. The remaining pigtail lead 330 of coil 326 is coupled to output port 1122 of integrated-optic circuit 220 through a splice 1146 and PM fiber 1142 of appropriate length, as is readily determinable by one skilled in the art, to satisfy Lyot-type depolarizer conditions. The birefringence axis of fiber 1142 is maintained at a 45° displacement to the birefringence axis of the waveguide of integrated-optic circuit 220, to satisfy Lyot-type depolarizer conditions.

Figure 12:
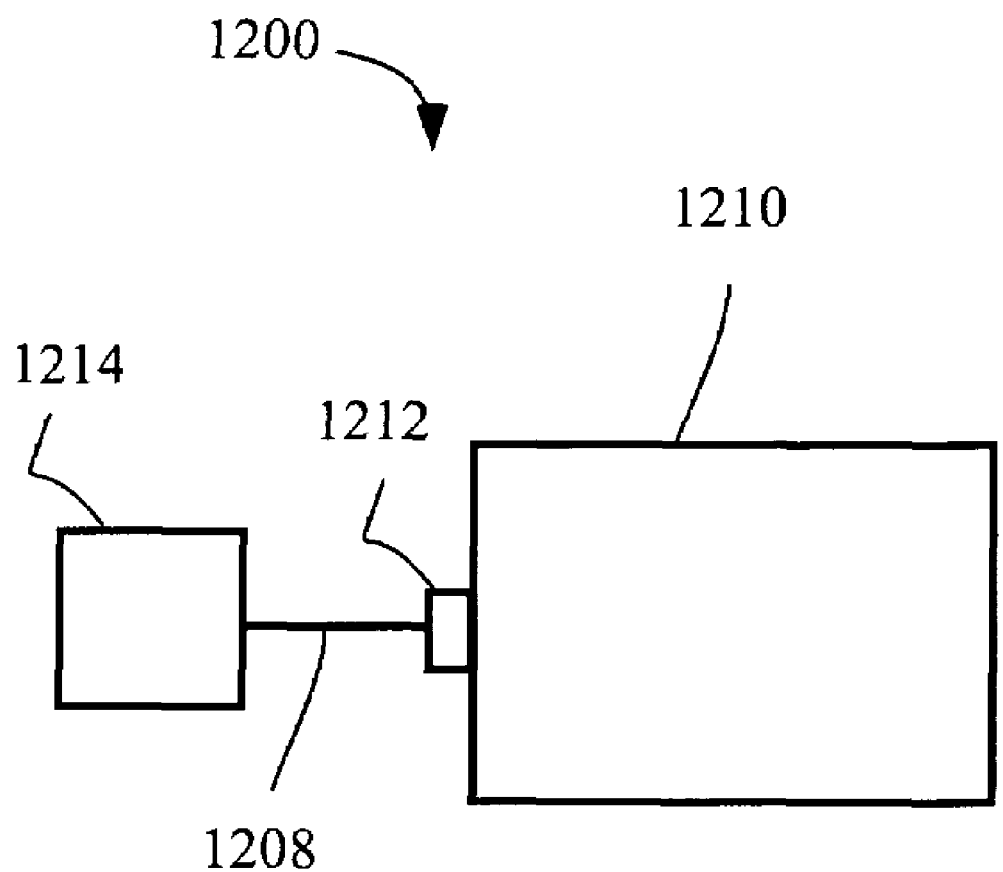
FIG. 12 is an article of manufacture according to certain aspects of the invention.

Turning now to FIG. 12, an article 1200 includes an integrated optic circuit 1210 of known construction, having an optic waveguide with birefringence properties and whose birefringence axis is oriented in a known direction. Examples of such integrated optic circuits include: phase modulators of the Mach -10 053 series, commercially available from Covega, 10335 Guilford Rd., Jessup, Md. 20794; low-loss and wideband phase modulators commercially available from EO Space, 8711 148th Avenue NE, Redmond, Wash. 98052; and modulators, such as models PM-150-005 and PM-150-080, commercially available from JDS Uniphase Corporation, 1768 Automation Parkway, San Jose, Calif. 95131. Article 1200 further includes a PM fiber optic lead coupled to the waveguide within integrated optic circuit 1210 through an input port 1212 of known construction, such as that of a fiber block assembly. The birefringence axes of fiber 1208 is maintained at a 45° displacement with respect to the birefringence axis of the waveguide within integrated-optic circuit 1210. Further, polarization maintaining fiber 1208 has a typical birefringence of approximately 0.0004.

The depolarization length is calculated as $L=\lambda^2/(\Delta\lambda*\delta n)$, where $\lambda$ is a light source spectrum central wavelength and $\Delta\lambda$ is a spectrum linewidth. The physical length of polarization maintaining fiber 1208 is preferably on the order of one meter or longer, enough to have a depolarization length longer than the depolarization length L for a typical broadband light source 1214 (which is either of the Super Luminescent Diode (SLD) or Amplified Spontaneous Emission (ASE) type). The waveguide birefringence is so high that the Lyot condition L2>2L1 will be easily satisfied with waveguides having a physical length of 20–35 mm, thus being capable of successful operation as a Lyot-type depolarizer second segment. The light source 1214 is shown in directly connected to integrated-optic circuit 1210 for illustrative purposes only. The invention also contemplates articles where the light source is coupled to the input 1212 through other known intervening components, such as splices, coupler's, and sections of optic fiber.

Numerous alternative embodiments of the present invention exist. Alternatives for aspects of the invention that could be implemented without undue experimentation by one of ordinary skill in the art include substitution of the preferred integrated-optic circuit with regard to its material constitution and circuit features, the types of polarization maintaining and single mode fibers employed, the type and circuit features of the coupler and of the splices employed. Further, instruments based on the Sagnac effect other than interferometric fiber-optic gyroscopes can benefit from aspects of the present invention. Also, virtually any optic coupler can be employed, and can have any N×M configuration As will now be appreciated, the present invention is not limited to multipurpose integrated optic circuit components, but may be used with virtually any components having a birefringent crystal substrate waveguide.

While the depolarization features provided by the present invention allow effective use of single-mode optical components, it is possible to employ aspects of the present invention in arrangements where single mode optical components are not present. Although certain embodiments of the present invention described herein contemplate arrangements producing Lyot-type depolarization, it should be understood that the depolarization referred to herein includes incomplete depolarization as well as pseudo-random polarization output with an average low degree of polarization, for any input state of polarization.

The steps or operations described herein are just exemplary. There may be many variations to these steps or operations without departing from the spirit of the invention. For instance, the steps may be performed in a differing order, or steps may be added, deleted, or modified. Also, the pigtail termination process can be carried out simultaneously or at different times, as may be advantageous in different circumstances.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus comprising:
    an optical circuit device having at least one input coupled to a light source, at least two outputs and a birefringent crystal substrate waveguide having a first birefringence axis, between said input and said outputs;
    a connecting fiber having a second birefringence axis at an angular displacement of approximately 45 degrees to said first birefringence axis, connected to said at least one input of said optical circuit device;
    a loop of polarization maintaining optic fiber having having first and second ends where one of the first and second ends is connected to one of the at least two outputs and the other of the first and second ends is connected to the other of the at least two outputs, the first and second ends each having a birefringence axis at an angular displacement of approximately 0 degrees to said first birefringence axis;
    the optical circuit device, connecting fiber and loop cooperating to form a Lyot-type depolarizer.

2. The apparatus of claim 1 wherein said optical circuit device further has a housing surrounding said waveguide, with said waveguide mounted at a fixed position in said housing.

3. The apparatus of claim 1 wherein said waveguide comprises a substrate of non-isotropic material.

4. The apparatus of claim 1 wherein said optical circuit device comprises a multifunction integrated optical chip.

5. The apparatus of claim 1 wherein said optical circuit device comprises a multifunction integrated optical chip that includes a waveguide coupler/beam splitter comprising said birefringent crystal substrate waveguide.

6. The apparatus of claim 1 wherein said loop comprises a sensing coil, the first and second ends are connected respectively to the at least two outputs without any splices between the at least two outputs and the loop.

7. The apparatus of claim 1 wherein all fiber and devices connected in series between the light source and the connecting fiber are single mode type.

8. The apparatus of claim 1 wherein an input fiber made of single mode optical fiber couples light from the light source to an end of the connecting fiber.

9. The apparatus of claim 1 wherein said input fiber is of polarization maintaining optical fiber composition and said light source emits polarized light.

10. The apparatus of claim 1 further comprising an orientation fixing support supporting one end of said connecting fiber for optical coupling to the waveguide of said optical circuit device so as to maintain the approximate 45 degree displacement between said first birefringence axis and said second birefringence axis.

11. The apparatus of claim 10 wherein said orientation fixing support comprises a fiber block assembly mounted to said optical circuit device.

12. The apparatus of claim 11 wherein said fiber block assembly is mounted to each output of said optical circuit device with a zero degree angle to the first birefringence axis.

13. The apparatus of claim 11 wherein said fiber block assembly is mounted to the input of said optical circuit device with a 45 degree angle to the first birefringence axis.

14. The apparatus of claim 1 wherein said at least two outputs are coupled to a sensing coil comprising a continuous optical fiber of single mode fiber composition, with ends that comprise pigtails for coupling to the outputs of said optical circuit device.

15. An apparatus comprising:
    one segment of a Lyot-type depolarizer comprising a waveguide of birefringent crystal substrate material, having a first birefringence axis;
    an optical circuit comprising said waveguide of birefringent crystal substrate material, having at least one input coupled to a light source and at least two outputs, with the waveguide of birefringent crystal substrate material between said input and said outputs;
    another segment of the Lyot-type depolarizer comprising a connecting polarization maintaining fiber having a preselected length, a second birefringence axis at an angular displacement of approximately 45 degrees to said first birefringence axis, and one end connected to one of said at least two outputs of said optical circuit device; and
    a loop of single mode optic fiber having having first and second ends where one of the first and second ends is connected to the other end of the connecting fiber and the other of the first and second ends is coupled to the other of the at least two outputs.

16. The apparatus of claim 15 wherein said loop comprises a sensing coil.

17. The apparatus of claim 15 wherein said optical circuit comprises a multifunction integrated optical chip that includes a waveguide coupler/beam splitter comprising said waveguide of birefringent crystal substrate material.

18. A method comprising the steps of:
providing an optical circuit with at least one input, at least two outputs and a waveguide of birefringent crystal substrate material between said input and said outputs, said waveguide having a first birefringence axis and comprising one segment of a Lyot-type depolarizer;
providing a coupling fiber having a second birefringence axis and comprising another segment of a Lyot-type depolarizer; and
connecting one end of said coupling fiber to one the outputs of said optical circuit with a fixed angular displacement of approximately 45 degrees between said first and said second birefringence axes;
connecting the other end of the coupling fiber to a first end of a loop of single mode optic fiber having having first and second ends where the other of the first and second ends is coupled to the other of the at least two outputs.

19. A method comprising the steps of:
providing an optical circuit device having at least one input coupled to a light source, at least two outputs and a birefringent crystal substrate waveguide having a first birefringence axis, between said input and said outputs;
connecting a connecting fiber having a second birefringence axis at an angular displacement of approximately 45 degrees to said first birefringence axis, connected to said one input of said optical circuit device;
connecting one of first and second ends of a loop of polarization maintaining optic fiber to one of the at least two outputs and connecting the other of the first and second ends to the other of the at least two outputs, the first and second ends each having a birefringence axis at an angular displacement of approximately 0 degrees to said first birefringence axis;
the optical circuit device, connecting fiber and loop connected to cooperate with said waveguide to form a Lyot-type depolarizer.

* * * * *